F. C. MORTON.
TIRE BUILDING MACHINE.
APPLICATION FILED JUNE 23, 1913. RENEWED AUG. 2, 1918.
Patented Apr. 1, 1919.
2 SHEETS—SHEET 1.
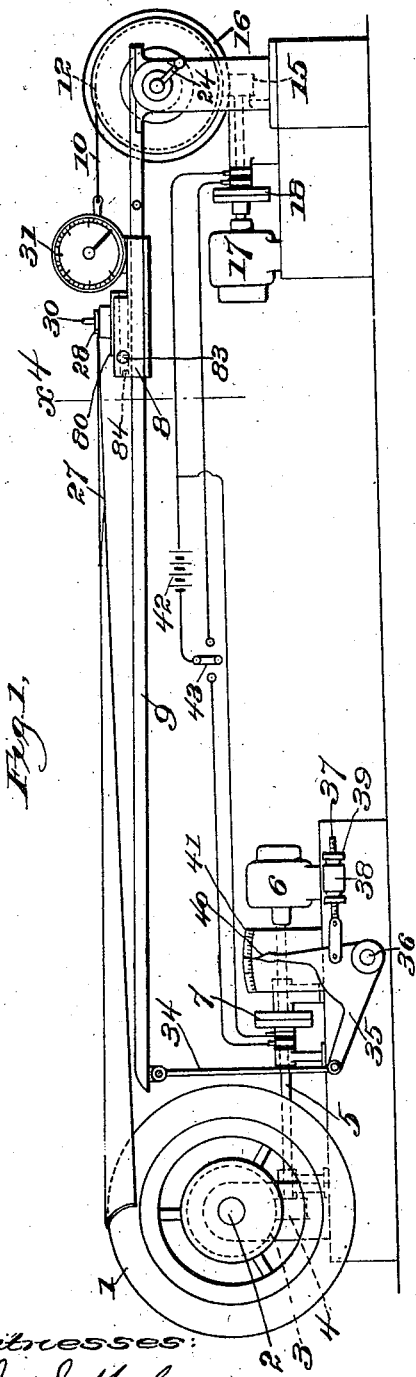
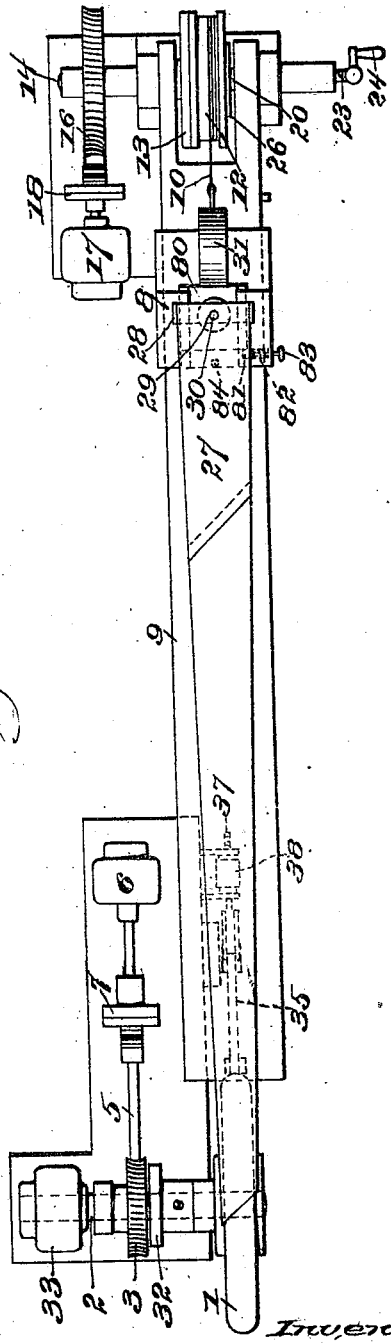

F. C. MORTON.
TIRE BUILDING MACHINE.
APPLICATION FILED JUNE 23, 1913. RENEWED AUG. 2, 1918.
1,298,768.
Patented Apr. 1, 1919.
2 SHEETS—SHEET 2.
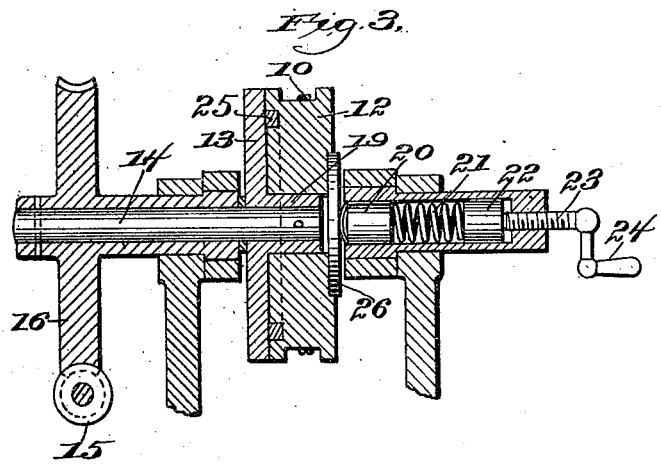
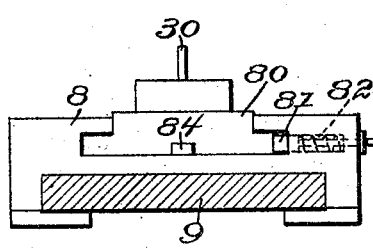
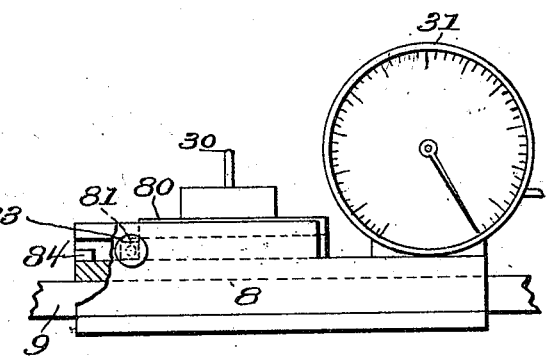
Witnesses:
Jas. J. Maloney.
Ethel M. Simpson.
Inventor:
Frederic C. Morton
by H. A. Swonson, atty.

UNITED STATES PATENT OFFICE.

FREDERIC C. MORTON, OF NEW HAVEN, CONNECTICUT, ASSIGNOR OF ONE-HALF TO FRED BURTON CARLISLE, OF CRANSTON, RHODE ISLAND.

TIRE-BUILDING MACHINE.

1,298,768. Specification of Letters Patent. Patented Apr. 1, 1919.

Application filed June 23, 1913, Serial No. 775,229. Renewed August 2, 1918. Serial No. 248,072.

*To all whom it may concern:*

Be it known that I, FREDERIC C. MORTON, a citizen of the United States, residing in New Haven, in county of New Haven and State of Connecticut, have invented an Improvement in Tire-Building Machines, of which the following description, in connection with the accompanying drawings, is a specification, like letters on the drawings representing like parts.

The present invention relates to a tire building machine and is embodied in a machine for stretching strips of tire fabric and laying them on the surface of a rotatable shaping core. In accordance with the invention the strips of fabric which may be previously cut to the right lengths, are attached to the core at one end by adhesion while the core is stationary; and are also attached at the opposite end to a stretching and tension device which is independent of the core and adapted to stretch the fabric before the core is rotated to lay on the strip. The stretching device is shown as consisting of a traveling member adapted to be operated upon by force exerted means so arranged as to yield to a greater force acting in the opposite direction, so that after the fabric has been stretched to the extent desired, the stretching device operates as a tension device to maintain the fabric in its stretched condition while it is drawn around the core by the rotation thereof, the force utilized to rotate the core being greater than that which acts on the starting device.

I have herein shown the tension and stretching device as having an adjustable friction device, one member of which is operated by a motor for the purpose of stretching the fabric until the friction is overcome, after which said motor-operated member and drum operate as a tension brake; but it is obvious that other expedients capable of performing the same functions may be employed without departing from the invention. The traveling member to which the fabric is attached is so arranged that any lateral movement of said member is prevented as it travels toward the core, the said member thus constituting means for keeping the fabric in true alinement with the periphery of the core.

The invention further relates to certain novel details of construction and arrangement which will be more fully described hereinafter.

Figure 1 is a side elevation of the machine embodying the invention;

Fig. 2 is a plan view of the same;

Fig. 3 is a transverse sectional detail on a larger scale, showing the tension device and the means for adjusting the tension;

Fig. 4 is an enlarged transverse sectional detail taken on line $X^4$ of Fig. 1, showing the traveling carriage or slide which forms part of the stretching and tension device; and Fig. 5 is a side elevation of the same on the same scale.

Referring to Fig. 1, the rotatable shaping core 1 is shown as mounted on an axle 2, which is provided with a worm gear 3, adapted to be driven by a worm 4 on a shaft 5, driven by the motor 6 herein shown as an electric motor. As herein shown the worm-gear is loosely mounted on the shaft, but is adapted to be clutched thereto when the core is to be rotated by the motor 6; and this construction will be more fully described hereinafter, in connection with its function in the operation. Interposed between the motor 6 and the shaft 5 is the clutch 7, which is herein shown as a magnetic clutch, so that the motor and the gear can be connected or disconnected at will. In the use of the machine the strip of fabric, which I have shown as having been previously cut to the desired length, is connected respectively with the stretching and tension device and the core on which it is pulled down tight so that it adheres in the usual way. The stretching and tension device is herein shown as constructed as follows:—A slide or carriage 8 is adapted to be drawn along a guideway 9, in a direction substantially in alinement with the direction of travel of the periphery of the core 1 and the said slide 8 is first pulled away from the core to stretch the fabric when the core is stationary; and then is pulled toward the core by the rotation of the core itself when the core is rotated. The movement of the slide 8 away from the core is herein shown as provided for as follows: The said member 8 is connected by means of a flexible cable 10 with a drum 12 which is in frictional contact with a rotating member 13, shown as a disk mounted on a shaft 14 and connected through the worm 15 and the gear 16 with a motor 17. A magnetic clutch 18 is shown as the means for connecting the motor and the gear, so that the two can be connected and disconnected without stopping the motor. The drum 12 and the disk 13 are in frictional contact with each other and the amount of frictional resistance between the two is adjustable so that the proper tension can be obtained. In the construction shown, the drum 12 is mounted directly on the hub 19 of the disk 13, and is pushed into contact with the face of the disk by means of a plunger 20, acted upon by a spring 21. The tension can be varied by a follower 22 and a screw-threaded stem 23 having an operating crank 24. At one end is shown an annular piece 25 of suitable material, such as brake-lining material, interposed between the face of the drum and the face of the disk. Since it is desirable that the plunger 20 should act on the middle of the drum, the bearing part of the drum is shown as bridged by a washer 26, which bears against the back of the drum, the plunger 20 bearing against the face of the washer at the middle.

While the expedient described in the foregoing paragraph is novel and useful, in that it combines in one device the means for stretching and the means for maintaining the desired tension while the core is rotating, it is obvious that other means might be employed without departing from the invention, which consists broadly in combining with a shaping core, devices whereby a strip of fabric which is to be wound on the core is stretched uniformly throughout its entire length prior to the winding operation; and maintained in its stretched condition during said winding operation.

In order to facilitate the feeding of the material to the machine and the attachment of the strips of fabric prior to such operation, I employ a dummy strip 27 of adhesive fabric, the ordinary tire fabric being suitable for the purpose, the said dummy strip being secured at one end to the traveling stretching member. The strip to be operated upon is thus very easily applied to the machine, one end being stuck to the under surface of the dummy strip and the other on the surface of the core, the ends of the strip to be operated on being held with sufficient firmness by surface adhesion.

In some cases it may be desirable to attach the cut strip of fabric to be used to a dummy strip prior to its application to the machine, and I have therefore shown the dummy strip as readily detachable from the traveling stretching member. For this purpose the dummy strip is provided at one end with a transverse brace 28, herein shown as a piece of flat metal of a length equal to or slightly greater than the width of the strip, and having a hole 29 in the middle to hook over a pin or projection 30 on the tension member.

The motor 17, after the strip of fabric has been applied to the machine, is connected by the clutch 18 with the driving shaft for the tension disk, and the strip of fabric is stretched until the resistance of the fabric is greater than that of the friction, so that the disk slips with relation to the drum.

In order that the attendant may intelligently regulate the tension, the cable 10, instead of being directly connected with the slide 8, may be, and preferably is connected with an indicator 31 shown as an ordinary spring scale, the pointer of which indicates the number of pounds of tension required to overcome the friction. It is obvious that, when the fabric has been stretched to the extent shown by the scale, the tension will remain approximately uniform, whether the driving disk moves with relation to the drum, or the drum moves with relation to the disk, provided that the speed or rate of movement is substantially the same. In the next step in the operation, therefore, the motor 17 is stopped, and the motor 6 is started so that the core 1 is rotated, and the stretched fabric is pulled around the core while a substantially even tension is maintained by the frictional contact between the drum 12 and the disk 13, as the cable 10 unwinds. The speed of the motor 6 and the gear ratio between said motor and the core is preferably such that the drum is caused to rotate at substantially the same rate of speed, as that of the disk while it was being rotated in the opposite direction. After the core has made a little more than a complete rotation, so that the entire strip has been laid on and overlapped, the core is stopped, and the shaping operation is then finished by the use of other appliances, which do not enter into this invention.

For a better understanding of this invention, however, it may be stated that the apparatus embodying the invention is intended to be used in connection with an apparatus for spinning in and shaping the fabric after it has been laid on the core as above described. Such an apparatus is shown and described in a prior application filed by me May 31, 1913, Serial No. 770,873. While this finishing appliance is in use, it is desirable that the core should rotate at a relatively high speed, and for this purpose I have herein shown the core 1 as arranged to be operated at two different speeds. In the construction shown, the shaft 2 is directly connected with a comparatively low speed motor 33, one which may operate, for example, at a speed of about 200 R. P. M.; and the worm gear 3 is loose on the shaft 2, but constitutes the armature member of a magnetic clutch, the magnetic member 32 of which is fast on the shaft 2. During the operation performed by the machine herein described, the clutch is connected; and since the rotation of the core through the worm and gear is very slow, the resistance of the motor 33 is not detrimental, so that it is not necessary to disconnect the said motor from the shaft during this part of the operation. It may be stated in this connection that the gearing shown is of such a nature that it requires much more power than is necessary to stretch the fabric to reverse the rotary movement of the core, so that no locking device is necessary to hold the core stationary during the preliminary stretching process. In fact, as herein shown, a worm gear of high ratio is used and such a gear is substantially irreversible.

After a strip of fabric has been wholly laid on the core, the overlapping end of the strip is drawn and rubbed down over the end which was first applied so as to make a strong adhering connection over the entire width of the strip; and the dummy strip is then pulled off, and the core is ready to be operated at high speed to fit the strip prior to the application of another strip.

To facilitate the removal of the dummy strip, it is desirable though not essential to relieve the tension; and for this purpose the pin 30 on which the brace 28 of the dummy strip is hooked, may be mounted on a supplemental slide 80, capable of longitudinal movement with relation to the slide 8, by means of a latch bolt 81, see Figs. 4 and 5. This latch bolt is shown as provided with a spring 82 and knob 83, while the independent movement of the slide 80 is limited by a stop 84. Before pulling off the dummy strip, the knob 83 is pulled out, thus relieving the tension; and when the slide 80 is pushed back to its normal position the latch-bolt snaps into place, leaving the appliance ready for the next operation.

For purposes of adjustment for different sized cores, I have shown the guide-way 9 as pivotally mounted at the rear end coaxially with the tension drum, the front end being supported on a strut 34 connected with a rocker 35 pivoted at 36 and connected with an adjusting screw 37 on which is threaded an adjusting nut 38 between two stationary ears 39 through which the adjusting screw extends. For convenience in making the adjustment, the rocker is provided with a pointer 40 and a scale 41 graduated to indicate the right positions for cores of different sizes.

In connection with the motors which operate alternately in the preliminary stretching of the fabric, and the laying of the stretched fabric on the core, I have chosen to describe the motors as operating continuously, and being connected and disconnected from the parts operated, by magnetic clutches. The clutches shown are of simple form, one member having windings, not shown, so as to constitute an electro-magnet; while the other member constitutes an armature which is drawn into frictional contact with the magnet when the latter is energized. For the control of the mechanism a source of current 42 is employed, and branch circuits from said source lead through the clutches respectively, the circuits being alternately closed by a switch 43. The circuits are shown in diagram, Fig. 1, and it is believed that the operation can be readily understood from the drawing without further description.

While the apparatus herein shown and described constitutes a practicable embodiment of the invention, it is obvious that modifications may be made without departing from the invention.

What I claim is

1. In a tire building machine, the combination with a shaping core adapted to receive on its surface a strip of tire fabric the end of which is attached thereto, of a stretching device adapted to be attached to the said strip; and means for moving said stretching device away from the core to stretch the fabric before the main portion thereof is laid on the core, by the rotation thereof.

2. In a tire building machine, the combination with a shaping core, of a stretching device, means for moving said stretching device away from the core while a strip of fabric is attached at one end to the core and at the other end to the stretching device; a tension device associated with the stretching device to regulate the extent to which the fabric is stretched; means for rotating the core; and means whereby the stretching device is capable of movement toward the core opposed by the resistance of the tension device.

3. In a tire building machine, the combination with a shaping core, of a stretching device so located with relation to the core that a strip of fabric attached at one end to the core and at the other end to the stretching device will lie in alinement with the periphery of the core; and means for moving the stretching device away from the core to stretch the fabric while the core is stationary.

4. In a tire building machine, the combination with a rotatable shaping core to receive and shape a strip of fabric, of means for stretching the fabric while the core is stationary with the end of the strip adhering thereto.

5. The combination with a rotatable core adapted to receive on its surface the end of a strip of fabric attached thereto, of a dummy strip also attached to said strip; a movable stretching member; and means for attaching said dummy strip to said stretching member.

6. In a tire building machine, the combination with a rotatable shaping core to receive and shape a strip of fabric; of means for stretching the strip of fabric endwise while the core is stationary with the end of the strip adhering thereto; and a dummy strip forming part of the stretching means and constituting means for attaching the strip of fabric thereto.

7. In a tire building machine the combination with a rotatable shaping core, of means for stretching throughout its entire length and maintaining stretched a strip of fabric long enough when stretched to go around the periphery of the said core and overlap at the ends; means for rotating said core to lay the strip thereon; and means for holding the strip against lateral movement during its travel toward the core.

8. In a tire building machine, the combination with a rotatable shaping core, of means for stretching throughout its entire length and maintaining stretched a strip of fabric long enough when stretched to go around the periphery of the said core and overlap at the ends; and means for rotating said core to lay the strip thereon.

9. The combination with a core adapted to receive and shape a strip of tire fabric after the end of the strip has been attached to the core by adhesion; of means for rotating said core; a traveling stretching member connected with the strip of fabric; means for operating the said stretching member; and means for alternately controlling the operating means for the stretching member and the rotating means for the core.

10. In a tire building machine, a rotatable core for shaping a strip of fabric, a traveling member adapted to be secured to the strip of fabric, a guide for said traveling member; and means for adjusting said guide for cores of different sizes.

11. The combination with a rotatable core, of a traveling member adapted to be connected with a strip of fabric which is joined by adhesion to the face of the core; a rotatable drum connected with said member through a flexible cable wound on the drum; a disk in frictional engagement with the face of said drum; and means for rotating said disk.

12. The combination with a core; of a motor adapted to rotate said core; a longitudinally movable stretching and tension device; a motor adapted to cause the longitudinal movement thereof; and means common to both motors for operatively connecting one and disconnecting the other.

In testimony whereof, I have signed my name to this specification in the presence of two subscribing witnesses.

FREDERIC C. MORTON.

Witnesses:
JOSEPH P. LIVERMORE,
JAS. J. MALONEY.